Jan. 13, 1953 W. F. SHURTS 2,625,247
AXIALLY ENGAGING FRICTION CLUTCH
Filed Sept. 26, 1946 2 SHEETS—SHEET 2
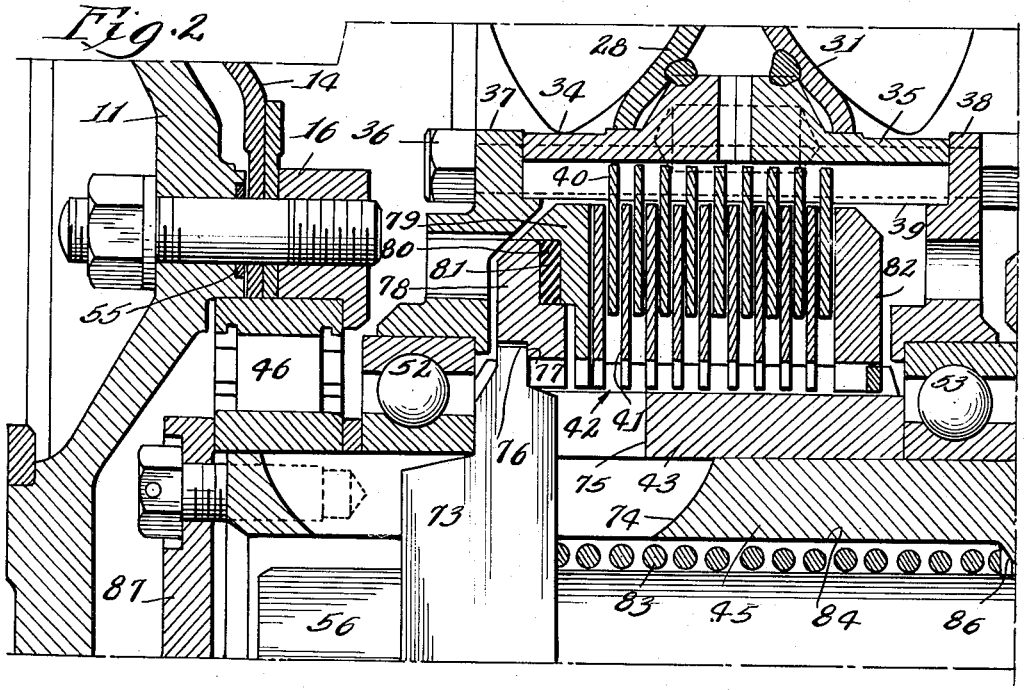
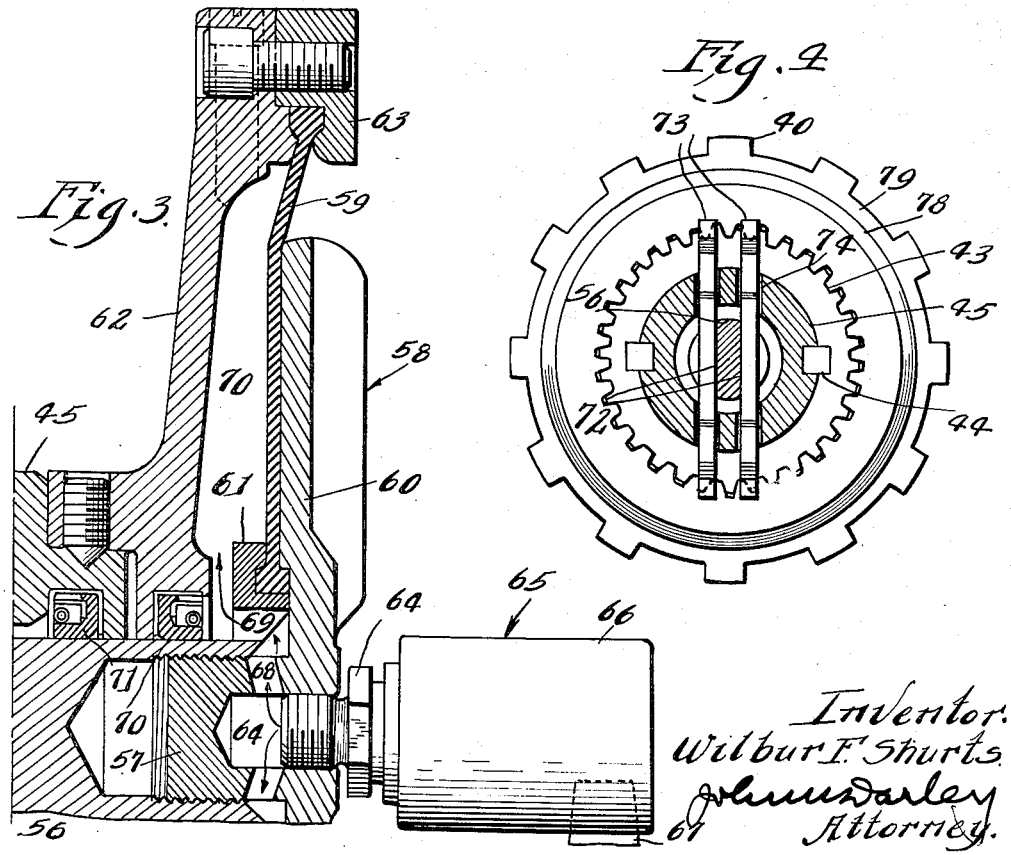
Inventor:
Wilbur F. Shurts
John Warley
Attorney.

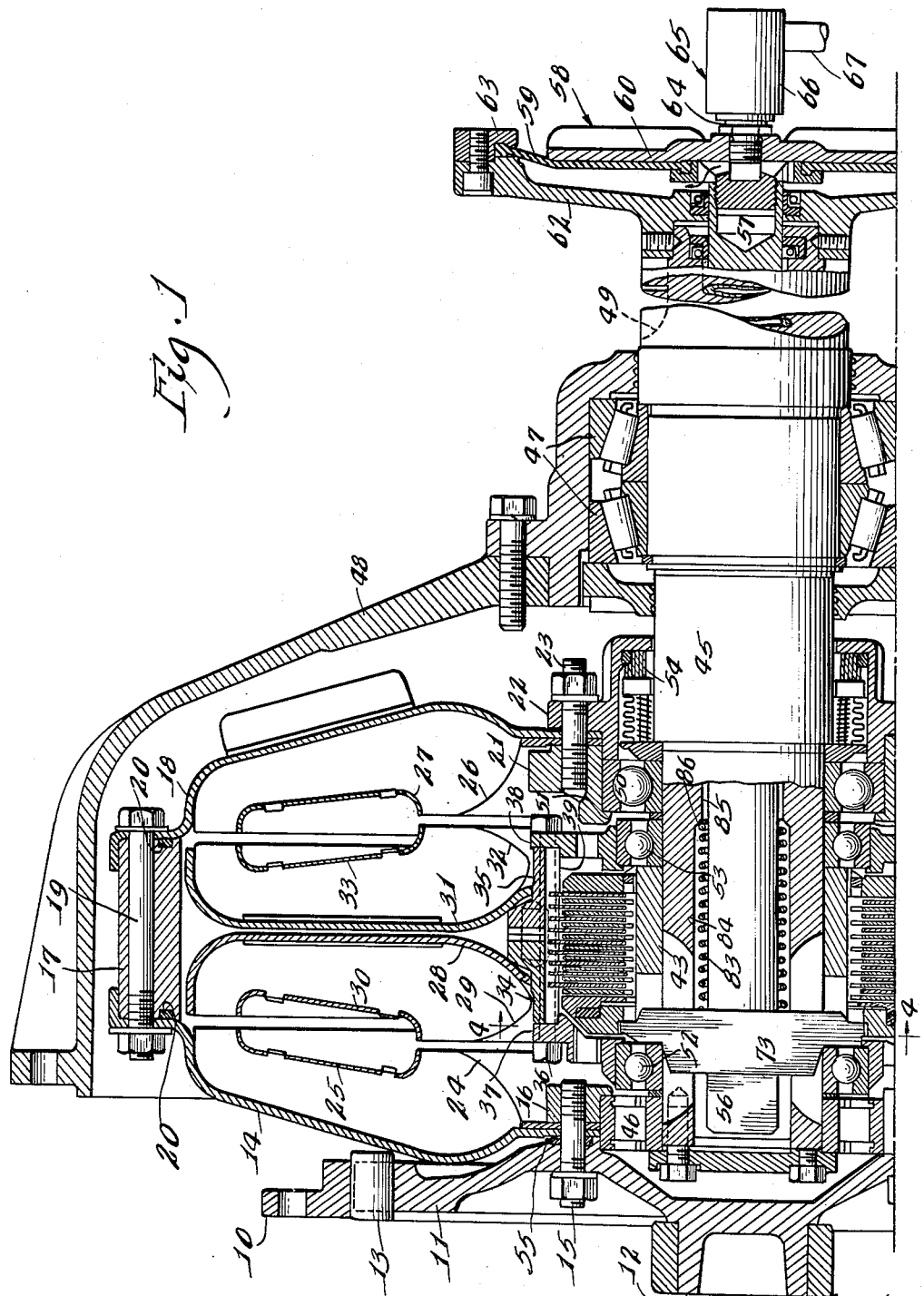

Patented Jan. 13, 1953

2,625,247

UNITED STATES PATENT OFFICE 2,625,247

AXIALLY ENGAGING FRICTION CLUTCH

Wilbur F. Shurts, Rockford, Ill., assignor to Twin Disc Clutch Company, Racine, Wis., a corporation of Wisconsin Application September 26, 1946, Serial No. 699,502

5 Claims. (Cl. 192—69)

My invention relates to hydraulic couplings and more particularly to a mechanism of this type including a clutch which is arranged to prevent as desired the application of any torque to the driven shaft regardless of the speed of the engine or other power source.

One operating difficulty frequently encountered with the ordinary hydraulic coupling is the inability to positively interrupt power flow to the driven shaft as may be required by certain types of the connected machinery, for example, where there is a requirement for shifting gears in a transmission. Even at low speeds of the engine and hence of the coupling impeller, there exists a so-called drag torque which is reflected in a creeping of the runner shaft, or a tendency of this nature in the event that the load resistance exceeds this torque. The customary solution for this problem takes the form of an auxiliary friction clutch in the drive train externally of the coupling, but this arrangement increases the overall length of the coupling which is objectionable in installations where space limitation is an important factor.

It is therefore one object of my invention to provide a hydraulic coupling in which final drive to the driven shaft is effected through a clutch included within the length of the coupling and capable of positive disengagement to definitely interrupt power flow through the coupling.

A further object is to provide a coupling of the character indicated wherein the clutch is actuated to engagement through a novel and compact, mechanical arrangement which insures a substantially uniform distribution of pressure to the pressure plate of the clutch.

These and further objects of the invention will be set forth in the following specification, reference being had to the accompanying drawings, and the novel means by which said objects are effectuated will be definitely pointed out in the claims.

In the drawings:

Fig. 1 is a fragmentary, sectional elevation of the coupling showing the same in non-power transmitting condition.

Fig. 2 is an enlarged, sectional elevation of an interior part of the coupling showing the arrangement for transmitting engaging pressure to the coupling clutch.

Fig. 3 is an enlarged section of a portion of the diaphragm air cylinder.

Fig. 4 is a section along the line 4—4 in Fig. 1 showing the cantilever elements through which pressure is applied to the clutch.

Referring to Figs. 1 and 2 of the drawings, the numeral 10 designates an internally toothed, driving ring which may be bolted to an engine flywheel, or other source of power, and which meshes with an externally toothed, driven spider 11 having a hollow hub 12 that is coaxial with and preferably piloted in the flywheel. Each tooth on the spider 11 may be encased in a rubber sleeve 13 to cushion the drive and compensate for minor axial misalignments between the flywheel and coupling assembly. The inner rim of an impeller 14 is clamped by means of studs 15 between the spider 11 and a ring 16 located inwardly of the impeller and the outer rim is shaped to receive one end of a spacer ring 17 whose opposite end is received within the correspondingly shaped outer rim of an impeller 18 that is positioned in facing relation to the impeller 14. A plurality of circumferentially spaced cap screws 19 extending through the spacer ring 17 secure the impellers together and leakage of the working liquid, usually an appropriate oil, in this locality is prevented by packing 20—20 between the ends of the ring 17 and the adjacent portions of the impeller rims. The inner rim of the impeller 18 is clamped between a ring 21 located inwardly of the impeller and an outer ring 22 by means of a plurality of studs 23. The impeller 14 is provided with a plurality of radial blades 24 and a core ring 25, thus defining a plurality of radial liquid passages. Similarly positioned and secured blades 26 are arranged around the impeller 18 to form in conjunction with a core ring 27 like liquid passages.

A runner 28 having a plurality of radial blades 29 defining therewith and a core ring 30 a plurality of radial, liquid passages is located in facing and cooperating relation to the impeller 14 and a similar runner 31 having blades 32 and a core ring 33 defining like radial, liquid passages is positioned in facing and cooperating relation to the impeller 18, thus forming a pair of liquid working circuits. Power flow through the coupling may be reversed without affecting its operability and, in this event, the runners 28 and 31 act as impellers and the impellers 14 and 18 serve as runners.

The inner peripheries of the runners 28 and 31 are welded or otherwise attached to driving sleeves 34 and 35, respectively, whose inner ends are maintained in abutting relation by bolts 36 which extend through retaining rings 37 and 38 that respectively engage the outer ends of the sleeves 34 and 35. So far as operational effect is concerned, the sleeves function as a single sleeve and they are internally splined at 39 (see Fig. 2) for driving engagement with outer peripherally toothed, driving plates 40 that are alternately arranged with respect to driven plates 41. The plates 40 and 41 form part of a multiple disk clutch 42 that is generally coplanar with the rotating plane of the runner assembly. The inner peripheries of the driven plates 41 have toothed engagement with the splined periphery of a clutch hub 43 that is keyed at 44 (see Fig. 4) to a driven shaft 45 which extends outwardly of the coupling in a direction away from the spider 11.

The inner end of the shaft 45 is piloted in a bearing 46 whose outer race fits within the ring 16 and a shouldered portion of the spider 11, thus providing a bearing support for one end of the impeller assembly, while an intermediate part of the shaft is journaled in a pair of bearings 47 (see Fig. 1) which are carried by a housing 48 that encloses the coupling and may be bolted to the engine flywheel housing (not shown). Outwardly of the housing 48, the shaft 45 is keyed at 49 for securement to the load. The other end of the impeller assembly is supported by a bearing 50 whose outer race is received within the ring 21 and held in position by the ring 22 against an annular shoulder 51 in the ring 21, the inner race of the bearing 50 encircling the shaft 45. The runner assembly is supported by bearings 52 and 53 which are interposed between the shaft 45 and the retaining rings 37 and 38, respectively. Leakage of oil from the right end of the coupling, as viewed in Fig. 1, is prevented by a conventional, bellows oil seal indicated generally by the numeral 54 and at the left end by a packing ring 55 clamped between the impeller 14 and spider 11, the latter inwardly of the ring 55 being solid.

The mechanism for operating the clutch 42 constitutes an important feature of the invention and will now be described. A pull rod 56 is slidable coaxially through, and its right end extends beyond the similar end of, the shaft 45 and is internally threaded for attachment to a central boss 57 (see Fig. 3) provided on a diaphragm piston denoted generally by the numeral 58. The piston 58 comprises a diaphragm 59 coaxial with the rod 56 and whose inner periphery is anchored and clamped between a support plate 60 whose diameter is less than that of the diaphragm and a retaining ring 61 appropriately secured to the plate 60. The outer periphery of the diaphragm 59 is anchored and clamped between a disk 62 secured to the shaft 45 and a retaining ring 63 attached to the disk 62. The disk 62 constitutes a cylinder for receiving a suitable fluid under pressure, such as air, with the diaphragm 59 and plate 60 conjointly acting as the piston member of this assembly.

A coaxial chamber 64 is formed in the boss 57 and threaded in this chamber is the rotary member 64 of a characteristic rotary air seal denoted generally by the numeral 65 whose stationary member 66 is connected by a hose 67 to a source of air pressure. Air delivered to the chamber 64 flows through passages 68 and 69 in the boss 57 and ring 61, respectively, into the cylinder space 70 and thus provides a means for shifting the diaphragm 59 and the connected pull rod 56 towards the right. An air seal ring 70 is interposed between the rod 56 and the disk 62 and an oil seal ring 71 between the same rod and the driven shaft 45.

Shifting of the rod 56 towards the right effects the engagement of the clutch 42 through instrumentalities that will now be described. Adjacent its left end, the rod 56 is milled flat on opposite sides at 72 to receive the intermediate portions of a pair of clutch engaging bars 73—73 (see Figs. 2 and 4) whose opposite ends extend outwardly through slots 74 and 75 respectively provided in the shaft 45 and clutch hub 43 so that the bars rotate with the driven shaft. As indicated in Fig. 2, the bars 73 lie to the left of the clutch plate assembly. The extremities of each bar 73 are shaped to provide noses 76 which are engageably related to an annular shoulder 77 provided on the adjacent face of a clamp ring 78 which is internally toothed to mesh and rotate with the hub 43.

A pressure plate 79 is interposed between the clamp ring 78 and the first clutch plate of the clutch assembly, which in the arrangement shown is a driven plate 41, and the pressure plate 79 is also internally toothed to mesh and rotate with the hub 43. The opposed faces of the ring 78 and plate 79 are complementarily shaped and arranged to form a chamber 80 which is totally enclosed by the defining surfaces and which is completely filled by a rubber ring 81. As clearly indicated in Fig. 2, the ring 78 and plate 79 are nestably related; the ring 78 being slidable relative to the pressure plate 79 within the limitation of the cushion afforded by the rubber ring 81 so that pressure applied to the ring 78 by the bars 73 is transmitted to the pressure plate 79 only through the rubber ring 81 which serves to space the ring 78 and plate 79 from each other at all times. Clamping of the clutch plates 40 and 41 is effected against an abutment ring 82 which rotates with the hub 43 and is suitably held against endwise movement towards the right.

As will be obvious from the above description, when air under pressure is admitted to the cylinder space 70, the diaphragm 59 and therefore the pull rod 56 are shifted towards the right to accordingly cause the bars to bear against the clamp ring 78 which in turn transmits the applied pressure through the rubber ring 81 to the pressure plate 79 to thereby engage the clutch.

An important feature of the above arrangement is the manner in which the engaging pressure is uniformly distributed to the clutch plates. For example, in a design intended to transmit 250 H. P. at 1200 R. P. M. using 100 p. s. i. air pressure, the force required to engage the clutch is of the order of 5000 pounds. While this force is actually concentrated by the bars 73 at four points on the clamping ring 78, the loading, for purpose of analysis, may be regarded as applied to the ring 78 at two points 180° apart, since due to the close spacing of the bars in relation to the uncontacted portion of the shoulder 77, the two bars may be considered as a single bar. In an ordinary clutch construction, the clamp ring 78 would constitute the pressure plate of the clutch, but if thus used in the present instance, the concentrated loading at widely separated points would so distort the clamp ring that it would be incapable of applying pressure uniformly to the clutch plates.

This problem is solved by transmitting the load on the clamp ring 78 to the pressure plate 79 through the totally confined, rubber ring 81. The design constitutes an application of Pascal's law in that pressure applied to the rubber ring 81 is transmitted undiminished in all directions through the latter ring and normal to its enclosing surfaces. Therefore, while the clamp ring 78 may be distorted by its unequal loading, the equalizing action of the rubber ring 81 insures a substantially uniform application of pressure to the clutch plates. Moreover, the ring 81 permits the use of the bars 73 which are a simple and inexpensive method of transferring the pull rod force to the clutch.

When the air pressure is relieved, the clutch 42 is released by means of a spring 83 which encircles the pull rod 56 in an enlarged portion 84 of the bore 85 in the shaft 45 through which the rod extends, the ends of the spring abutting, respectively, the bars 73 and a shoulder 86 in the bore. The left end of the bore portion 84 is closed by a plate 87 which also serves as a retainer for the inner race of the bearing 46.

The clutch 42 provides a releasable, mechanical connection such that power flow from the coupling to the shaft can be positively made or broken and, when interrupted, the principal engine torque will not be exerted on the shaft, thus preventing drag torque creeping of the shaft at idling speeds of the engine.

I claim:

1. Clutch means for providing a mechanical connection between a rotating member and a shaft coaxial therewith comprising a plurality of plates encircling the shaft and alternately connected to the member and shaft and engageable to provide a driving connection between the member and shaft, and means for engaging the plates comprising a pair of axially shiftable, nested rings rotatable with the shaft and complementarily formed on their opposed faces to define a completely enclosed, annular chamber, a rubber body completely filling the chamber and spacing the rings axially, one of the rings being engageable with one of the plates, a rod shiftable through the shaft, and means actuated by the rod and extending transversely of the shaft for contacting separated points of the other ring, the engaging pressure being transmitted uniformly through the rubber body to said one ring.

2. Clutch means for providing a mechanical connection between a rotating member and a shaft coaxial therewith comprising a plurality of plates encircling the shaft and alternately connected to the member and shaft and engageable to provide a driving connection between the member and shaft, and means for engaging the plates comprising a pair of axially shiftable, nested rings rotatable with the shaft and complementarily formed on their opposed faces to define a completely enclosed, annular chamber, a rubber body completely filling the chamber and spacing the rings axially, one of the rings being engageable with one of the plates, a rod shiftable through the shaft, and a pair of closely spaced bars actuated by the rod and extending in opposite directions transversely of the shaft, the extremities of the bars engaging the other ring and the engaging pressure being transmitted uniformly through the rubber body to said one ring.

3. Clutch means for providing a mechanical connection between a rotating member and a shaft coaxial therewith comprising a plurality of plates encircling the shaft and alternately connected to the member and shaft and engageable to provide a driving connection between the member and shaft, and means for engaging the plates comprising a pair of relatively movable rings coaxial with the clutch and complementarily shaped on their opposed faces to include therebetween a completely enclosed annular chamber, a rubber body completely filling the chamber and spacing the rings axially, one of the rings being engageable with the clutch, and means contacting the other ring at substantially diametrically related points for applying pressure thereto, the engaging pressure being transmitted uniformly through the rubber body to said one ring.

4. Clutch means for providing a mechanical connection between a rotating member and a shaft coaxial therewith comprising a plurality of plates encircling the shaft and alternately connected to the member and shaft and engageable to provide a driving connection between the member and shaft, and means for engaging the plates comprising a pair of axially shiftable, nested rings rotatable with the shaft and complementarily formed on their opposed faces to define a completely enclosed, annular chamber, a rubber body completely filling the chamber and spacing the rings axially, one of the rings being engageable with one of the plates, a rod shiftable through the shaft, and means actuated by the rod and extending in opposite directions transversely of the shaft for contacting substantially diametrally related points of the other ring, the engaging pressure being transmitted uniformly through the rubber body to said one ring.

5. Clutch means for providing a mechanical connection between a rotating member and a shaft coaxial therewith comprising a plurality of plates encircling the shaft and alternately connected to the member and shaft and engageable to provide a driving connection between the member and shaft, and means for engaging the plates comprising a pair of axially shiftable, nested rings rotatable with the shaft and complementarily formed on their opposed faces to define a completely enclosed, annular chamber, a rubber body completely filling the chamber and spacing the rings axially, one of the rings being engageable with one of the plates, a rod shiftable through the shaft, and a pair of closely spaced bars actuated by the rod and extending in opposite directions transversely of the shaft, the extremities of the bars engaging the radially inward edge of the other ring and the elastic body being positioned outwardly of the bars' extremities, the engaging pressure being transmitted uniformly through the rubber body to said one ring.

WILBUR F. SHURTS.

REFERENCES CITED

The following references are of record in the file of this patent:

UNITED STATES PATENTS

| Number | Name | Date |
|---|---|---|
| 1,913,525 | Valentine et al. | June 13, 1933 |
| 2,279,019 | Black | Apr. 7, 1942 |
| 2,287,608 | French | June 23, 1942 |
| 2,289,019 | Jessen | July 7, 1942 |
| 2,387,418 | Sundt | Oct. 23, 1945 |

FOREIGN PATENTS

| Number | Country | Date |
|---|---|---|
| 256,720 | Great Britain | Aug. 18, 1926 |
| 337,242 | Great Britain | Oct. 30, 1930 |
| 547,984 | Great Britain | of 1942 |